US011230387B2

(12) United States Patent
Joshi et al.

(10) Patent No.: US 11,230,387 B2
(45) Date of Patent: *Jan. 25, 2022

(54) MOTOR DRIVEN PROPULSOR OF AN AIRCRAFT

(71) Applicant: General Electric Company, Schenectady, NY (US)

(72) Inventors: Narendra Digamber Joshi, Niskayuna, NY (US); Konrad Weeber, Niskayuna, NY (US); Michael Solomon Idelchik, Niskayuna, NY (US)

(73) Assignee: General Electric Company, Schenectady, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/021,864

(22) Filed: Sep. 15, 2020

(65) Prior Publication Data
US 2021/0179283 A1    Jun. 17, 2021

Related U.S. Application Data

(63) Continuation of application No. 16/229,125, filed on Dec. 21, 2018, now Pat. No. 10,807,730.

(51) Int. Cl.
*F02D 29/06* (2006.01)
*H02P 9/04* (2006.01)
(Continued)

(52) U.S. Cl.
CPC ............... *B64D 27/24* (2013.01); *F02K 5/00* (2013.01); *H02K 7/14* (2013.01); *H02M 7/46* (2013.01);
(Continued)

(58) Field of Classification Search
CPC ....... B64D 27/24; B64D 2221/00; F02K 5/00; H02M 7/46; H02M 1/0006; H02P 27/06; H02K 7/14
See application file for complete search history.

(56) References Cited

U.S. PATENT DOCUMENTS 4,176,392 A    11/1979   Cronin et al.
4,927,329 A    5/1990    Klinman et al.
(Continued)

FOREIGN PATENT DOCUMENTS

EP    1930554 A2    6/2008

OTHER PUBLICATIONS

Secunde et al., Integrated Engine-Generator Concept for Aircraft Electric Secondary Power, Auxiliary Systems, NASA Technical Reports Server (NTRS), Jun. 1, 1972, pp. 1-22.

*Primary Examiner* — Tulsidas G Patel
*Assistant Examiner* — Thomas K Quigley
(74) *Attorney, Agent, or Firm* — Dority & Manning, P.A.

(57) ABSTRACT

A motor driven propulsor of an aircraft includes magnets disposed in fan shrouds of fan blades connected with a fan hub, a stator having individual conductive coils in a nacelle located radially outside of the fan hub, and a distributed inverter assembly having several inverter power stages and gate drivers, each of the inverter power stages coupled with a separate gate driver of the gate drivers and a separate coil of the coils in the stator. Each of the gate drivers is configured to individually control supply of direct current to the corresponding inverter power stage. Each of the inverter power stages is configured to convert the direct current supplied to the inverter power stage to an alternating current that is supplied to the corresponding coil in the stator to rotate the magnets and the fan blades around a center line of the fan hub for propelling the aircraft.

20 Claims, 6 Drawing Sheets

(51) Int. Cl.
    *B64D 27/24* (2006.01)
    *F02K 5/00* (2006.01)
    *H02K 7/14* (2006.01)
    *H02M 7/46* (2006.01)
    *H02P 27/06* (2006.01)
    *H02M 1/00* (2006.01)

(52) U.S. Cl.
    CPC .......... *H02P 27/06* (2013.01); *B64D 2221/00* (2013.01); *H02M 1/0006* (2021.05)

(56) References Cited

U.S. PATENT DOCUMENTS

| | | | |
|---|---|---|---|
| 5,078,628 A | 1/1992 | Garis, Jr. | |
| 5,252,875 A | 10/1993 | Veronesi et al. | |
| RE34,609 E | 5/1994 | Muller | |
| 5,607,329 A | 3/1997 | Cho et al. | |
| 6,729,140 B2 | 5/2004 | Care et al. | |
| 7,944,077 B2 | 5/2011 | Fischer et al. | |
| 7,952,244 B2* | 5/2011 | Colin | H02K 21/14 |
| | | | 310/67 R |
| 7,973,421 B2 | 7/2011 | Sharp | |
| 8,522,522 B2 | 9/2013 | Poisson | |
| 8,745,990 B2* | 6/2014 | Burkholder | F01D 15/10 |
| | | | 60/788 |
| 9,143,023 B1* | 9/2015 | Uskert | H02K 1/12 |
| 9,764,848 B1* | 9/2017 | Vondrell | B64D 27/18 |
| 10,218,232 B2* | 2/2019 | Niergarth | H02K 1/2786 |
| 10,240,477 B2* | 3/2019 | Ettridge | F01D 25/24 |
| 10,252,791 B2* | 4/2019 | Cheung | B64C 1/16 |
| 2004/0090130 A1 | 5/2004 | Kaneko et al. | |
| 2007/0165376 A1* | 7/2007 | Bones | H01L 25/165 |
| | | | 361/688 |
| 2011/0056183 A1 | 3/2011 | Sankrithi et al. | |
| 2011/0101906 A1 | 5/2011 | Tagome | |
| 2013/0000273 A1* | 1/2013 | Roberge | F02C 3/073 |
| | | | 60/226.1 |
| 2014/0245748 A1* | 9/2014 | Anghel | F02C 7/36 |
| | | | 60/783 |
| 2014/0345281 A1* | 11/2014 | Galbraith | B60K 6/24 |
| | | | 60/716 |
| 2015/0214802 A1 | 7/2015 | Kim et al. | |
| 2016/0123174 A1* | 5/2016 | Ettridge | F02N 11/04 |
| | | | 290/46 |
| 2017/0122257 A1 | 5/2017 | Sankrithi | |
| 2017/0129617 A1* | 5/2017 | Shah | B64D 27/24 |
| 2017/0253340 A1* | 9/2017 | Vondrell | B64D 27/18 |
| 2018/0127089 A1* | 5/2018 | Welstead | B64D 27/02 |
| 2018/0229851 A1 | 8/2018 | Joshi et al. | |
| 2018/0230845 A1* | 8/2018 | Joshi | B64D 27/18 |

* cited by examiner

MOTOR DRIVEN PROPULSOR OF AN AIRCRAFT

CROSS-REFERENCE TO RELATED APPLICATIONS

This application is a continuation of U.S. patent application Ser. No. 16/229,125, which was filed on 21 Dec. 2018, and the entire disclosure of which is incorporated herein by reference.

FIELD

The subject matter described herein relates to propulsion systems of aircraft.

BACKGROUND

A traditional aircraft propulsor includes a gas turbine engine located at or within a fan hub of the propulsor. The gas turbine engine consumes fuel to rotate fan blades within a nacelle of the propulsor. This rotation of the fan blades generates thrust to propel the aircraft.

These types of propulsors suffer from several shortcomings. The equipment needed to convert rotation of the turbine engine into rotation of the fan blades can require separate gearboxes, bearings, cooling systems, and the like, all of which undesirably add to the weight of the aircraft. Additionally, gas turbine engines generate significant acoustic noise during operation, which can be undesirable to passengers of the aircraft.

Some proposed aircraft propulsors may include an electric motor to assist with rotation of the fan blades. These motors can help propel the aircraft after the gas turbine engine has provided significant thrust during takeoff or lift off of the aircraft. But, some of these proposed motors may not generate enough power for the thrust needed for takeoff or lift off of the aircraft. Additionally, some of these motors can generate significant heat that may require separate cooling systems to maintain in an operative state. Moreover, the motors may not be able to operate on their own and without associated gas turbine engines due to the motors being less reliable than the gas turbine engines. For example, an inverter that supplies current to the coils of the motor may fail, which prevents the motor from continuing to operate. Such a motor requires an additional propulsor (e.g., the associated gas turbine engine) to prevent catastrophic failure of the aircraft.

BRIEF DESCRIPTION

In one embodiment, a motor driven propulsor of an aircraft is provided. The propulsor includes magnets disposed in fan shrouds of fan blades connected with a fan hub, a stator having individual conductive coils in a nacelle located radially outside of the fan hub, and a distributed inverter assembly having several inverter power stages and gate drivers, each of the inverter power stages coupled with a separate gate driver of the gate drivers and a separate coil of the coils in the stator. Each of the gate drivers is configured to individually control supply of direct current to the corresponding inverter power stage. Each of the inverter power stages is configured to convert the direct current supplied to the inverter power stage to an alternating current that is supplied to the corresponding coil in the stator to rotate the magnets and the fan blades around a center line of the fan hub for propelling the aircraft.

In one embodiment, a method for providing a motor driven propulsor of an aircraft is provided. The method includes placing magnets disposed in fan shrouds of fan blades connected with a fan hub, positioning a stator having individual conductive coils in a nacelle located radially outside of the fan hub, and coupling several inverter power stages of a distributed inverter assembly with several gate drivers. Each of the inverter power stages is coupled with a separate gate driver of the gate drivers. The method also includes conductively coupling each of the inverter power stages with a different coil of the coils in the stator. Each of the gate drivers is coupled with a different inverter power stage of the inverter power stages to individually control supply of direct current to the corresponding inverter power stage. Each of the inverter power stages is coupled with the corresponding gate driver and the corresponding coil to convert the direct current supplied to the inverter power stage to an alternating current that is supplied to the corresponding coil in the stator to rotate the magnets and the fan blades around a center line of the fan hub for propelling the aircraft.

In one embodiment, a motor driven propulsor includes magnets disposed in fan shrouds of fan blades connected with a fan hub, a stator having individual conductive coils in a nacelle located radially outside of the fan hub, and a distributed inverter assembly having several inverter power stages. Each of the inverter power stages is close coupled with a separate coil of the coils in the stator. Each of the inverter power stages is configured to power the corresponding coil in the stator to rotate the magnets and the fan blades around a center line of the fan hub for generating a propulsive force. The inverter power stages are separately coupled with the coils in the stator such that one or more inverter power stages continue powering the corresponding coils to continue generating the propulsive force after failure of at least one of the inverter power stages.

DETAILED DESCRIPTION

Embodiments of the subject matter described herein relate to motor driven propulsors of aircraft. In one embodiment, a fan of a turbofan engine is combined with an electric motor (also referred to as a generator). The fan can be combined with the motor without also connecting the turbofan or a turbine engine with the fan (or any other fan of the same aircraft, in one example). The electrical motor is located on outside of the fan in a nacelle of the aircraft. A shrouded fan is provided with permanent magnets embedded in the shroud of fan blades of the fan. The stator of the motor is provided in the nacelle. A close coupled distributed inverter can be provided to provide alternating current (AC) power to coils of the stator (that are in the nacelle). This distributed inverter also can be in the nacelle. The external and internal surfaces of the nacelle may be used to dissipate heat of the electric motor to air flowing inside and outside the nacelle to assist with cooling and rejecting heat from the motor and associated components. One or more gate drivers are provided to individually control power stages of the distributed inverter using a high-speed communication channel, such as via optical fibers, in one embodiment. A direct current (DC) power bus can be provided around the nacelle to provide power to the distributed power stages of the inverter.

By placing the electrical motor directly on the shroud of the fan, significant savings of weight are achieved relative to turbofan propulsors, as the need for separate or additional gearboxes, bearings, cooling systems, and housings are eliminated. Significant weight savings can be achieved by utilizing the motor at the highest shear gap velocities obtainable by the motor. Use of an electric motor instead of a turbofan also significantly reduces the acoustic noise generated by operation of the propulsor.

While one or more embodiments described herein provide the stator and stator coils radially outward of a hub to which the fan blades of the propulsor are connected (e.g., relative to an axis of rotation or center line of the hub of the propulsor), alternatively, the stator and coils can be placed inside the hub to rotate the fan blades.

Figure 1:
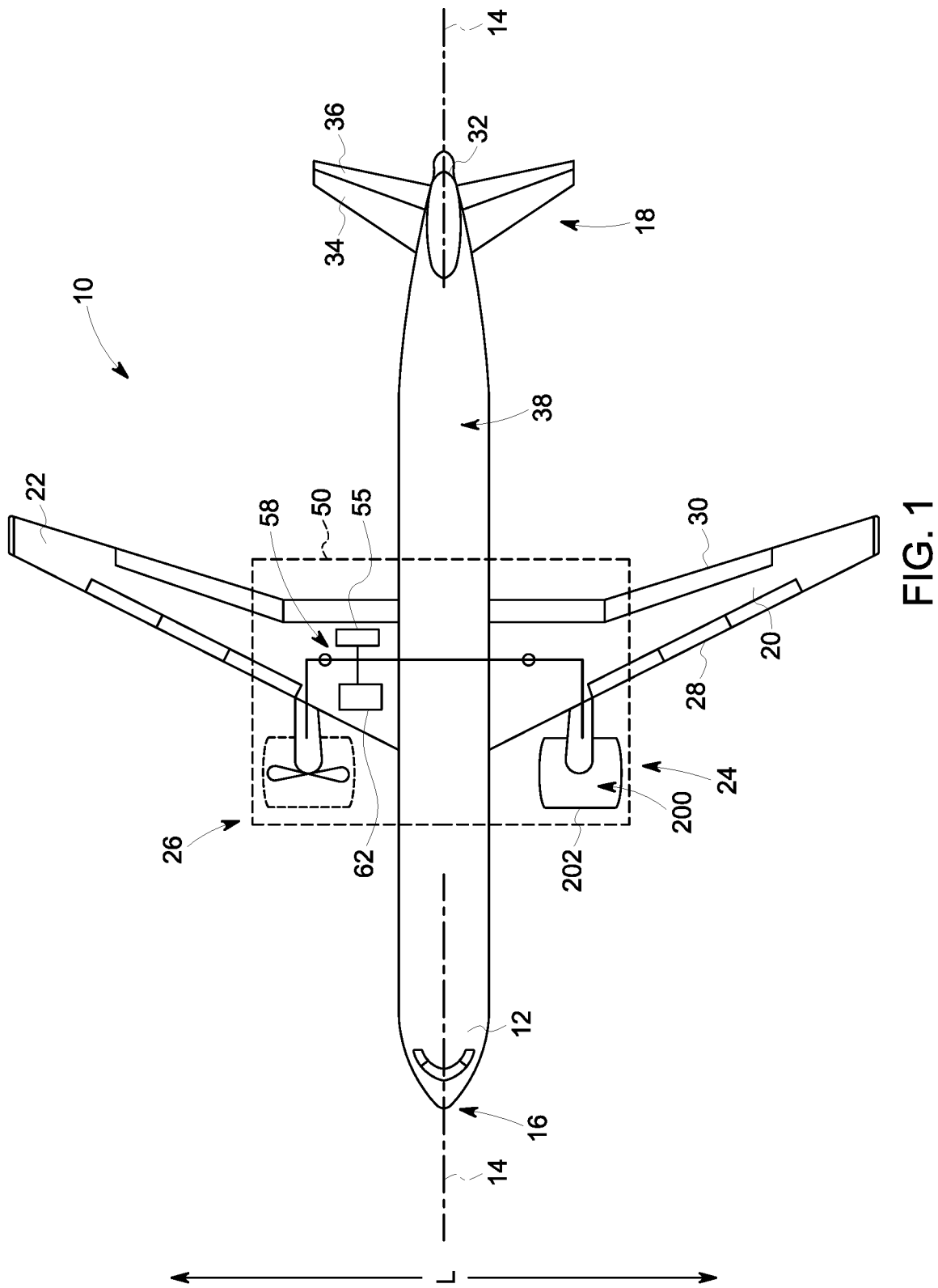
FIG. 1 provides a top view of an aircraft as may incorporate various embodiments of the inventive subject matter described herein.

FIG. 1 provides a top view of an aircraft 10 as may incorporate various embodiments of the inventive subject matter described herein. The aircraft 10 defines a longitudinal centerline 14 that extends therethrough, a lateral direction L, a forward end 16, and an aft end 18. The aircraft 10 includes a fuselage 12 that longitudinally extends from the forward end 16 of the aircraft 10 to the aft end 18 of the aircraft 10, and a wing assembly including a port side and a starboard side. The port side of the wing assembly is a first, port side wing 20, and the starboard side of the wing assembly is a second, starboard side wing 22. The first and second wings 20, 22 each extend laterally outward with respect to the longitudinal centerline 14. The first wing 20 and a portion of the fuselage 12 together define a first side 24 of the aircraft 10, and the second wing 22 and another portion of the fuselage 12 together define a second side 26 of the aircraft 10. In the illustrated embodiment, the first side 24 of the aircraft 10 can be referred to as the port side of the aircraft 10, and the second side 26 of the aircraft 10 can be referred to as the starboard side of the aircraft 10.

Each of the wings 20, 22 includes one or more leading edge flaps 28 and one or more trailing edge flaps 30. The aircraft 10 further includes a vertical stabilizer 32 having a rudder flap (not shown) for yaw control, and a pair of horizontal stabilizers 34, each having an elevator flap 36 for pitch control. The fuselage 12 additionally includes an outer surface or skin 38. Alternatively, the aircraft 10 may additionally or alternatively include any other suitable configuration. For example, in other embodiments, the aircraft 10 may include any other configuration of stabilizer.

The aircraft 10 includes a propulsion system 50 having a first propulsor 200 and a second propulsor 200. As shown, each of the propulsors 200 is configured as an under-wing mounted propulsor and may be disposed in or may include a corresponding nacelle 202 of the aircraft 10. One propulsor 200 is mounted, or configured to be mounted, to the first side 24 of the aircraft 10, such as to the first wing 20 of the aircraft 10. The propulsion system 50 includes an electrical power bus 58 to supply current to the propulsors 200. The propulsion system 50 may include one or more energy storage devices 55 (such as one or more batteries or other electrical energy storage devices) electrically connected to the electrical power bus 58 for providing electrical power to the propulsors 200. As shown, the aircraft 10 does not include any turbine engine or other fuel-consuming engine that operates to generate thrust to propel the aircraft 10. Optionally, the aircraft 10 can include one or more turbine engines, turbofans, or the like, for providing thrust and/or generating electric current to power the propulsors 200.

Figure 2:
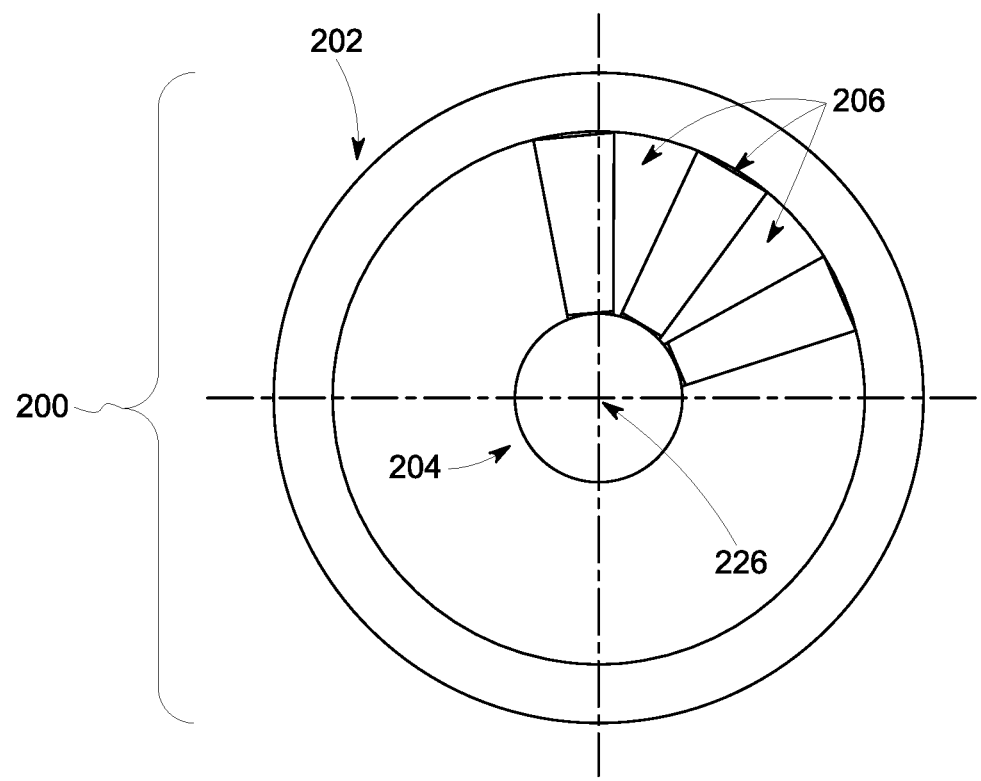
FIG. 2 illustrates a front view of one embodiment of a propulsor shown in FIG. 1.
Figure 3:
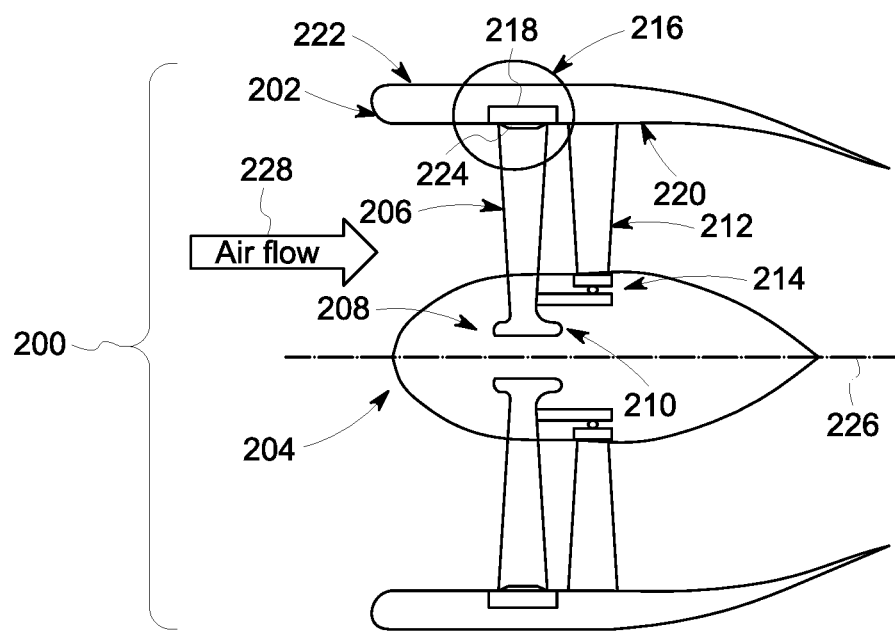
FIG. 3 illustrates a cross-sectional view of one embodiment of the propulsor shown in FIG. 2.

FIG. 2 illustrates a front view of one embodiment of one of the propulsors 200 shown in FIG. 1. FIG. 3 illustrates a cross-sectional view of one embodiment of the propulsor 200 shown in FIG. 2. The propulsor 200 includes a spinner 204 located within the nacelle 202. The spinner 204 is coupled with several fan blades 206 that extend radially outward from the spinner 204. These fan blades 206 also extend radially outward from a center line 226 or axis of rotation of the spinner 204. The spinner 204 houses a fan hub 208 to which inner ends 210 of the fan blades 206 are coupled. Outlet guide vanes 212 may radially extend from the spinner 204 toward the nacelle 202 and may be connected with the fan blades 206 by thrust bearings 214.

A rim-driven motor 216 includes a stator 218 that is at least partially disposed within the nacelle 202. The stator 218 can be positioned along an inner surface 220 of the nacelle 202 or closer to the inner surface 220 of the nacelle 202 than an opposite outer surface 222 of the nacelle 202. As shown in FIG. 3, the stator 218 extends around or encircles the center line 226 of the spinner 204 and fan hub 208. The motor 216 also includes magnets, such as permanent magnets, disposed in fan shrouds 224 of the fan blades 206. The fan shrouds 224 are located at or on ends of the fan blades 206 that are opposite the inner ends 210. For example, the fan shrouds 224 that include the magnets may be located closer to the nacelle 202 than the spinner 204 or fan hub 208. As described herein, the stator 218 includes conductive coils that are powered by separate inverter power stages of a distributed inverter of the propulsor 200 to rotate the magnets in the fan shrouds 224 (and, therefore, rotate the fan blades 206) to generate thrust to the aircraft 10.

As shown, the nacelle 202 is located radially outside of the spinner 204 and the fan hub 208 (relative to the center line 226) so that air flow 228 can pass between the spinner 204 and the inner surface 220 of the nacelle 202. Additional air flow can extend over the outer surface 222 of the nacelle 202. This air flow can help cool and/or reject heat from the components of the propulsor 200. For example, the coils, buses, inverter power stages, gate drivers, and the like, that are described herein may become heated during operation of the propulsor 200 due to the electric current flowing and/or induced in one or more of these components. Placing these components in the nacelle 202 and in thermal contact with the surfaces 220, 222 of the nacelle 202 provide the components with a much larger surface area over which to dissipate or reject heat into the external environment. For example, placing these components inside the spinner 204 or hub 208 can significantly decrease the surface area through which thermal energy can be transferred to the external environment relative to the much larger surface area of the inner and outer surfaces 220, 222 of the nacelle 202.

Figure 4:
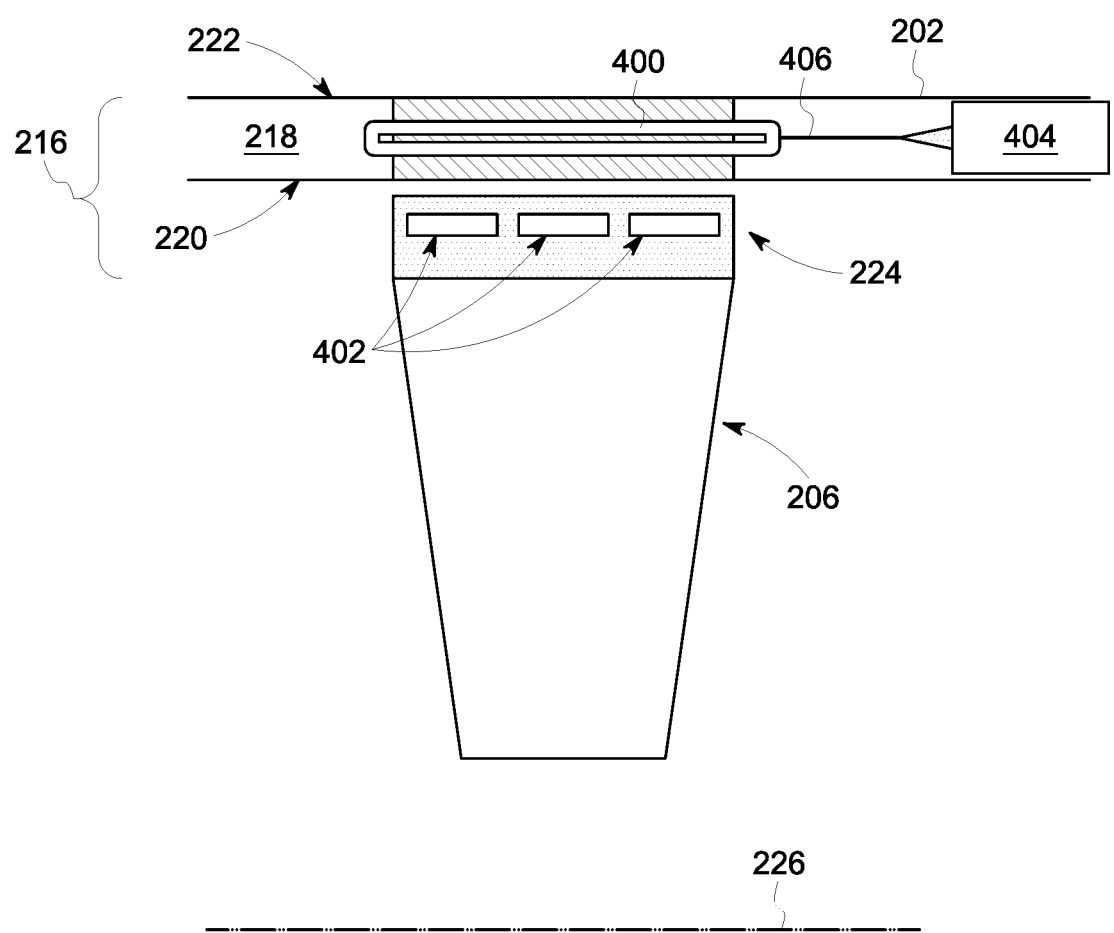
FIG. 4 illustrates part of one embodiment of a motor shown in FIG. 2.

FIG. 4 illustrates part of one embodiment of the motor 216 shown in FIG. 2. The portion of the motor 216 that is shown in FIG. 3 includes one of several conductive coils 400 through which AC is conducted to temporarily induce magnetic fields. These magnetic fields interact with the permanent magnetic fields provided by one or more permanent magnets 402 that are embedded in the shroud 224 of a fan blade 206. This interaction can move the fan blade 206 to rotate the spinner 204 around the center line 226 to generate thrust for propelling the aircraft 10.

The coil 400 is conductively coupled with one of several inverter power stages 404 of a distributed inverter assembly (described below) by one or more conductive buses 406. Alternatively, each of the inverter power stages 404 can represent an inverter. In one embodiment, the coils 400 are closely coupled with the inverter power stages 404. The conductive bus 406 may represent part of the power bus 58 shown in FIG. 1 or may represent another conductive bus. The inverter power stage 404 converts DC received from a source (e.g., the energy storage device 55 via the power bus 58) into a single phase of AC. This single phase of AC is conducted via the bus 406 to and through the coil 400 to create the temporary magnetic fields described above.

Figure 5:
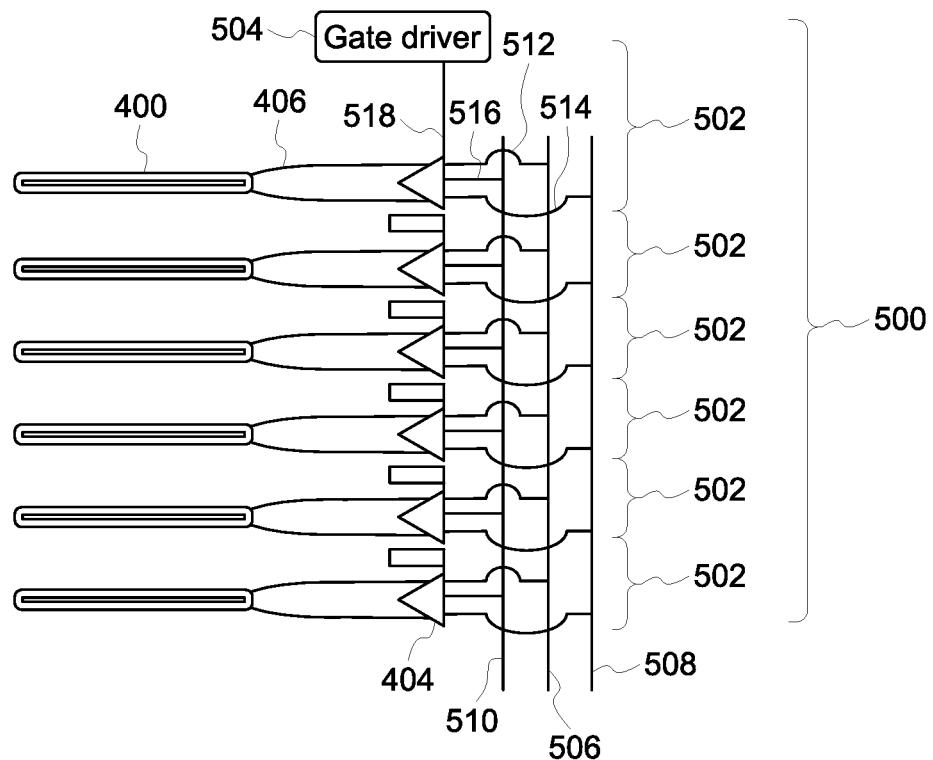
FIG. 5 illustrates one embodiment of a distributed inverter assembly of the propulsor shown in FIG. 2.
Figure 6:
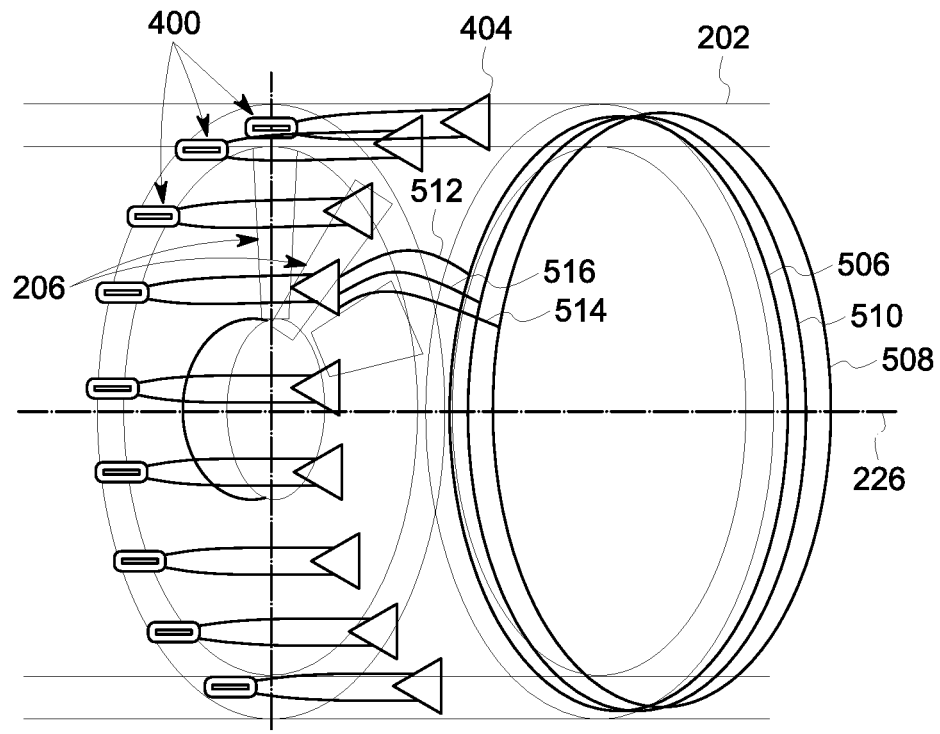
FIG. 6 also illustrates the distributed inverter assembly shown in FIG. 5.

FIGS. 5 and 6 illustrate one embodiment of a distributed inverter assembly 500 of the propulsor 200. The distributed inverter assembly 500 includes several circuit sets 502 of the inverter power stages 404, gate drivers 504 (not shown in FIG. 6), and the coils 400. Only a single inverter power stage 404 is shown in FIG. 5, but several of the inverter power stages 404 are provided in one embodiment.

In the illustrated embodiment, each set 502 of the distributed inverter assembly 500 includes an inverter power stage 404 separately controlled by a separate gate driver 504 and separately coupled with a different coil 400 in the stator 218. Stated differently, each coil 400 is separately powered with a different, single inverter power stage 404 instead of multiple coils 400 receiving one or more phases of AC from the same inverter power stage 404. Alternatively, two or more, but fewer than all, of the coils 400 may be connected with the same inverter power stage 404 such that multiple, but not all, of the coils 400 are powered by the phase of AC supplied from the same inverter power stage 404. The coils 400 may be separate from each other such that current conducted in one coil 400 is not conducted to any other coil 400.

Each inverter power stage 404 is connected with a separate gate driver 504. Alternatively, two or more inverter power stages 404 can be connected with the same gate driver 504. The inverter power stage 404 can be connected with the gate driver 504 by one or more optical connections 518, such as by one or more optical fibers. The use of optical fibers can reduce the effects of electromagnetic interference on the several gate drivers 504 communicating with the several inverter power stages 404 to ensure that the inverter power stages 404 are controlled to rotate the fan blades 206. Alternatively, the inverter power stages 404 can be connected with the gate drivers 504 using conductive connections (e.g., buses) or other types of connections.

The gate driver 504 is connected with DC buses 506, 508, 510, including a positive DC bus 506, a negative DC bus 508, and a neutral bus 510. Each gate driver 504 can include a connection 512 with the positive DC bus 506 that does not connect with the negative DC bus 508 or the neutral bus 510, a connection 514 with the negative DC bus 508 that does not connect with the positive DC bus 506 or the neutral bus 510, and a connection 516 with the neutral bus 510 that does not connect with the positive DC bus 506 or the negative DC bus 508.

The buses 506, 508, 510 can represent part of the power bus 58 shown in FIG. 1 to receive DC from the energy storage device 55, can be connected with the power bus 58 to receive DC from the energy storage device 55, or can represent other conductive bodies. While only a single set of the connections 512, 514, 516 between the gate drivers 504 and the buses 506, 508, 510 are shown in FIG. 6, each of the gate drivers 504 can include a set of the connections 512, 514, 516 with the corresponding buses 506, 508, 510. As shown in FIGS. 5 and 6, multiple or all gate drivers 504 can be connected with the same (e.g., common) positive DC bus 506, the same negative DC bus 508, and the same neutral bus 510. Alternatively, two or more of the gate drivers 504 can be connected with different positive DC buses 506, different negative DC buses 508, and/or different neutral buses 510.

The gate driver 504 controls conduction of positive DC from the positive DC bus 506, conduction of negative DC from the negative DC bus 508, and connects the inverter power stage 404 with the neutral bus 510 so that the inverter power stage 404 can convert the positive and negative DC into a single phase of AC current that is conducted to and through the corresponding coil 400. As described above, this helps drive the magnets 402 to rotate the fan blades 206 around the center line 226. The gate drivers 504 can be controlled by control signals sent from the controller 62, which may be based on manually input and/or automatically determined throttle instructions or directives for the aircraft 10.

As shown in FIG. 6, the coils 400, inverter power stages 404, gate drivers 504, and buses 406, 506, 508, 510 can be disposed inside the nacelle 202 between the inner and outer surfaces 220, 222 of the nacelle 202. These components may be in thermal contact with the surfaces 220 and/or 222 of the nacelle 202 so that heat generated by these components can be transferred to the surfaces 220 and/or 222 and dissipated outside of the propulsor 200.

The separate coils 400, separate inverter power stages 404, and separate gate drivers 504 can provide for increased reliability of the motor 216 relative to other non-distributed motor designs. For example, the failure of one or some (but not all) coils 400, the failure of one or some (but not all) inverter power stages 404, and/or the failure of one or some (but not all) gate drivers 504 does not prevent the motor 216 from continuing to rotate the fan blades 206. The failure an inverter power stage 404, the failure of a gate driver 504, the interruption or break of a connection between the inverter power stage 404 and the coil 400 that was connected with the inverter power stage 404, and/or the interruption or break of the conductive loop formed by the coil 400 may prevent that inverter power stage 404, that gate driver 504, and/or that coil 400 from operating to generate a magnetic field that rotates the fan blades 206. But, this failure or interruption will not prevent or stop other gate drivers 504, corresponding inverter power stages 404, and corresponding coils 400 from operating to generate magnetic fields that rotate the fan blades 206. While the motor 216 may operate to produce less peak power in such a failure or interrupted state, the motor 216 may continue to operate to generate thrust to keep propelling the aircraft 10.

In the embodiment shown in FIG. 4, the magnets 402 are disposed within the fan shrouds 224 of the fan blades 206 in locations that are radially inside of the inner surface 220 of the nacelle 202. For example, the magnets 402 can be located between the inner surface 220 of the nacelle 202 and the center line 226.

Figure 7:
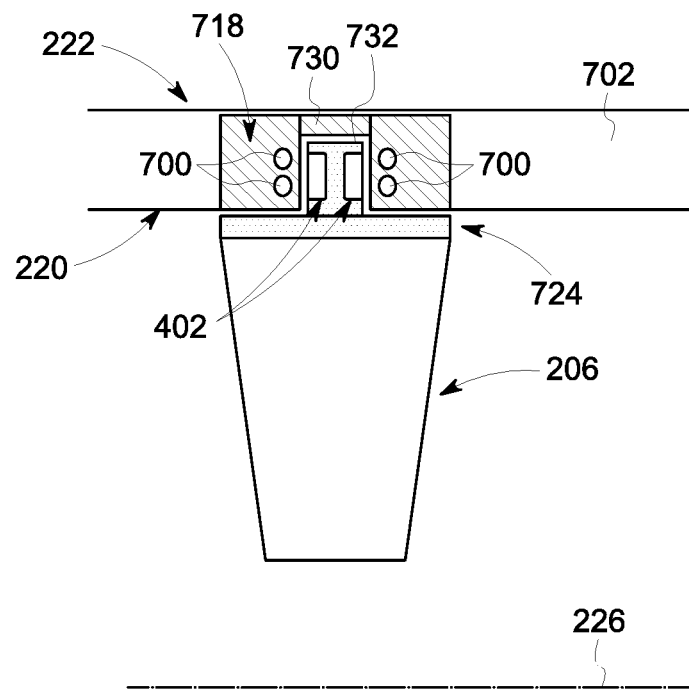
FIG. 7 illustrates another embodiment of a fan shroud and a fan blade of the propulsor shown in FIG. 2.

FIG. 7 illustrates another embodiment of a fan shroud 724 of the fan blades 206. The fan shrouds 724 can be coupled with the same fan blades 206 as the shroud 224. A nacelle 702 shown in FIG. 7 can be used in place of the nacelle 202 shown in FIGS. 2, 3, 4, and 6. One difference between the nacelle 702 and the nacelle 202 is that the nacelle 702 includes a recessed channel 730. This channel 730 can extend around the center line 226 of the fan hub 208 or spinner 204 such that the channel 730 extends along a path that encircles the center line 226 around and radially outside of the fan blades 206.

The fan shroud 724 includes a radial extension 732 that outwardly protrudes from the outer end of the fan shroud 724 away from the center line 226. The radial extension 732 is shaped to fit and move within the channel 730 in the nacelle 702 without contacting or rubbing against any surface of the nacelle 702. The magnets 402 can be located on opposite sides of the extension 732 such that the magnets 402 face away from each other. Conductive coils 700 located in a stator 718 can be used in place of the coils 400 in the stator 218. The cross-sectional view shown in FIG. 7 illustrates a plane that bisects each coil 700. As described above, each coil 700 can be separately closely coupled with a different inverter power stage 404, which can be separately coupled with a different gate driver 504.

The stator 718 can include several coils 700 located at different positions in the path that circumferentially extends around the center line 226. For example, the stator 718 can include more than just a single coil 700 on each side of the channel 730. In the illustrated embodiment, the stator 718 includes coils 700 on both sides of the channel 730. Alternatively, the stator 718 may have coils 700 on only one side of the channel 730.

Figure 8:
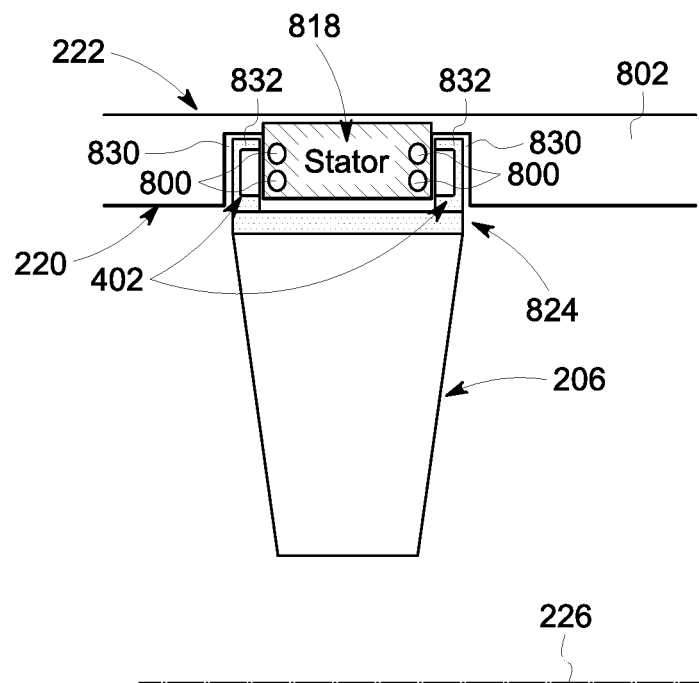
FIG. 8 illustrates another embodiment of a fan shroud and a fan blade of the propulsor shown in FIG. 2.

FIG. 8 illustrates another embodiment of a fan shroud 824 of the fan blades 206. The fan shrouds 824 can be coupled with the same fan blades 206 as the shroud 224. A nacelle 802 shown in FIG. 8 can be used in place of the nacelle 202 shown in FIGS. 2, 3, 4, and 6. One difference between the nacelle 802 and the nacelle 202 is that the nacelle 802 includes two recessed channels 830. Each of the channels 830 can extend around the center line 226 of the fan hub 208 or spinner 204 such that each channel 830 extends along a different path that encircles the center line 226 around and radially outside of the fan blades 206.

The fan shroud 824 includes multiple radial extensions 832 that outwardly protrude from the outer end of the fan shroud 824 away from the center line 226. Each of the radial extensions 832 is shaped to fit and move within a different one of the channels 830 in the nacelle 802 without contacting or rubbing against any surface of the nacelle 802. One or more magnets 402 can be located in each of the extensions 832 on opposite sides of a stator 818 in the nacelle 802 such that the magnets 402 face each other. Conductive coils 800 located in the stator 818 can be used in place of the coils 400 in the stator 218. As shown, the coils 800 are located between the magnets 402 in the stator 818. The cross-sectional view shown in FIG. 8 illustrates a plane that bisects each coil 800. As described above, each coil 800 can be separately closely coupled with a different inverter power stage 404, which can be separately coupled with a different gate driver 504. The stator 818 can include several coils 800 located at different positions in the path that circumferentially extends around the center line 226. For example, the stator 818 can include more than just a single coil 800 facing each magnet 402.

Figure 9:
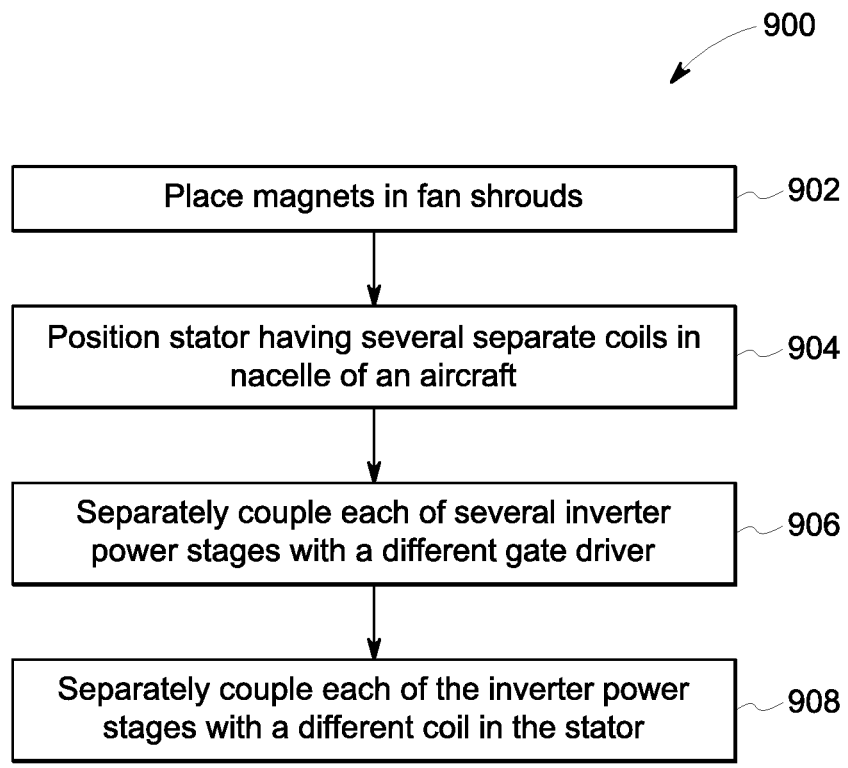
FIG. 9 illustrates a flowchart of one embodiment of a method for providing a motor-driven propulsor of an aircraft.

FIG. 9 illustrates a flowchart of one embodiment of a method 900 for providing a motor-driven propulsor of an aircraft. The method 900 can be used to create one or more embodiments of the propulsors 200 described herein. The operations of the method 900 can be performed in a different order than what is shown in the flowchart. For example, the order of two or more of the operations may be switched with each other and/or two or more of the operations may be performed concurrently and/or simultaneously.

At 902, magnets are placed into fan shrouds of fan blades that are connected with a fan hub. The magnets can be permanent magnets located in fan shrouds that are radially inside of a nacelle of the aircraft. The fan shrouds may be closer to the nacelle than the fan hub and may face the inner surface of the nacelle.

At 904, a stator is positioned in the nacelle of the aircraft. For example, conductive coils may be positioned in a housing that extends around and encircles the fan blades, the spinner, and the fan hub. The conductive coils can be separate from each other such that current conducted in one coil is not conducted from that coil to another coil.

At 906, several inverter power stages of a distributed inverter assembly are coupled with several gate drivers. Each of the inverter power stages can be coupled with a separate gate driver of the gate drivers. The connections between the inverter power stages and the gate drivers can be made using an optical connection, such as an optical fiber, to allow for the gate drivers to control the inverter power stages using light signals. Alternatively, the inverter power stages can be conductively coupled with the gate drivers.

At 908, the inverter power stages are conductively coupled with the coils in the stator. Each inverter power stage can be conductively coupled with a different coil so that failure of a gate driver, inverter power stage, coil, or connection therebetween does not prevent other coils inverter power stages, or gate drivers from continuing to operate to generate thrust by rotating the fan blades.

In one embodiment, a motor driven propulsor of an aircraft is provided. The propulsor includes magnets disposed in fan shrouds of fan blades connected with a fan hub, a stator having individual conductive coils in a nacelle located radially outside of the fan hub, and a distributed inverter assembly having several inverter power stages and gate drivers, each of the inverter power stages coupled with a separate gate driver of the gate drivers and a separate coil of the coils in the stator. Each of the gate drivers is configured to individually control supply of direct current to the corresponding inverter power stage. Each of the inverter power stages is configured to convert the direct current supplied to the inverter power stage to an alternating current that is supplied to the corresponding coil in the stator to rotate the magnets and the fan blades around a center line of the fan hub for propelling the aircraft.

Optionally, each of the inverter power stages is close coupled with the corresponding coil to which the inverter power stage is conductively connected. The nacelle can be configured to transfer heat generated in the coils of the stator over a large surface area that is outside of the fan blades and the fan hub. The coils of the stator and the inverter power stages may be thermally coupled with a radially inward surface of the nacelle and with a radially outward surface of the nacelle.

Optionally, the inverter power stages and the gate drivers are coupled with a direct current bus, and the inverter power stages, the gate drivers, and the direct current bus are located within the nacelle. The gate drivers can all be connected to a common positive direct current bus, a common negative direct current bus, and a common neutral bus. The magnets may be disposed within the fan shrouds of the fan blades in locations that are radially inside of an inner surface of the nacelle.

Optionally, the nacelle includes a channel that extends around the center line of the fan hub. The magnets can be located in radial protrusions of the fan shrouds that radially project away from the center line of the fan hub and into the channel in the nacelle. The conductive coils in the stator may be located on opposite sides of the channel in the nacelle.

Optionally, the nacelle includes channels that extend around the center line of the fan hub. The magnets can be located in radial protrusions of the fan shrouds that radially project away from the center line of the fan hub and into the channels in the nacelle. The conductive coils in the stator may be located between the channels in the nacelle.

Optionally, the inverter power stages are connected with the gate drivers by optical fibers and the gate drivers are configured to control supply of the direct current to the inverter power stages using control signals communicated via the optical fibers.

In one embodiment, a method for providing a motor driven propulsor of an aircraft is provided. The method includes placing magnets disposed in fan shrouds of fan blades connected with a fan hub, positioning a stator having individual conductive coils in a nacelle located radially outside of the fan hub, and coupling several inverter power stages of a distributed inverter assembly with several gate drivers. Each of the inverter power stages is coupled with a separate gate driver of the gate drivers. The method also includes conductively coupling each of the inverter power stages with a different coil of the coils in the stator. Each of the gate drivers is coupled with a different inverter power stage of the inverter power stages to individually control supply of direct current to the corresponding inverter power stage. Each of the inverter power stages is coupled with the corresponding gate driver and the corresponding coil to convert the direct current supplied to the inverter power stage to an alternating current that is supplied to the corresponding coil in the stator to rotate the magnets and the fan blades around a center line of the fan hub for propelling the aircraft.

Optionally, conductively coupling each of the inverter power stages with the different coil includes close coupling the inverter power stage with the corresponding coil. The coils of the stator can be positioned in the nacelle and the inverter power stages are coupled with the coils such that the coils and the inverter power stages are thermally coupled with a radially inward surface of the nacelle and with a radially outward surface of the nacelle.

The method also can include coupling the inverter power stages and the gate drivers with a direct current bus such that the inverter power stages, the gate drivers, and the direct current bus are located within the nacelle. The nacelle may include one or more channels that extend around the center line of the fan hub, and wherein the magnets are positioned in radial protrusions of the fan shrouds that radially project away from the center line of the fan hub and into the one or more channels in the nacelle. Optionally, the inverter power stages are coupled with the gate drivers by optical fibers.

In one embodiment, a motor driven propulsor includes magnets disposed in fan shrouds of fan blades connected with a fan hub, a stator having individual conductive coils in a nacelle located radially outside of the fan hub, and a distributed inverter assembly having several inverter power stages. Each of the inverter power stages is close coupled with a separate coil of the coils in the stator. Each of the inverter power stages is configured to power the corresponding coil in the stator to rotate the magnets and the fan blades around a center line of the fan hub for generating a propulsive force. The inverter power stages are separately coupled with the coils in the stator such that one or more inverter power stages continue powering the corresponding coils to continue generating the propulsive force after failure of at least one of the inverter power stages.

Optionally, the coils of the stator and the inverter power stages are thermally coupled with a radially inward surface of an aircraft nacelle and with a radially outward surface of the nacelle.

As used herein, an element or step recited in the singular and proceeded with the word "a" or "an" should be understood as not excluding plural of said elements or steps, unless such exclusion is explicitly stated. Furthermore, references to "one embodiment" of the presently described inventive subject matter are not intended to be interpreted as excluding the existence of additional embodiments that also incorporate the recited features. Moreover, unless explicitly stated to the contrary, embodiments "comprising," "including," or "having" (or like terms) an element, which has a particular property or a plurality of elements with a particular property, may include additional such elements that do not have the particular property.

As used herein, terms such as "system" or "controller" may include hardware and/or software that operate(s) to perform one or more functions. For example, a system or controller may include a computer processor or other logic-based device that performs operations based on instructions stored on a tangible and non-transitory computer readable storage medium, such as a computer memory. Alternatively, a system or controller may include a hard-wired device that performs operations based on hard-wired logic of the device. The systems and controllers shown in the figures may represent the hardware that operates based on software or hardwired instructions, the software that directs hardware to perform the operations, or a combination thereof.

As used herein, terms such as "operably connected," "operatively connected," "operably coupled," "operatively coupled" and the like indicate that two or more components are connected in a manner that enables or allows at least one of the components to carry out a designated function. For example, when two or more components are operably connected, one or more connections (electrical and/or wireless connections) may exist that allow the components to communicate with each other, that allow one component to control another component, that allow each component to control the other component, and/or that enable at least one of the components to operate in a designated manner.

It is to be understood that the subject matter described herein is not limited in its application to the details of construction and the arrangement of elements set forth in the description herein or illustrated in the drawings hereof. The subject matter described herein is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the presently described subject matter without departing from its scope. While the dimensions, types of materials and coatings described herein are intended to define the parameters of the disclosed subject matter, they are by no means limiting and are exemplary embodiments. Many other embodiments will be apparent to one of ordinary skill in the art upon reviewing the above description. The scope of the inventive subject matter should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

This written description uses examples to disclose several embodiments of the inventive subject matter, and also to enable one of ordinary skill in the art to practice the embodiments of inventive subject matter, including making and using any devices or systems and performing any incorporated methods. The patentable scope of the inventive subject matter is defined by the claims, and may include other examples that occur to one of ordinary skill in the art. Such other examples are intended to be within the scope of the claims if they have structural elements that do not differ from the literal language of the claims, or if they include equivalent structural elements with insubstantial differences from the literal languages of the claims.

What is claimed is:

1. A motor driven propulsor of an aircraft, the motor driven propulsor comprising:
    magnets disposed in fan shrouds of fan blades connected with a fan hub;
    a stator having individual conductive coils in a nacelle located radially outside of the fan hub; and
    a distributed inverter assembly having several inverter power stages and gate drivers, the inverter power stages coupled with the gate drivers and the coils in the stator,
    wherein the gate drivers are configured to control supply of direct current to the inverter power stages, and the inverter power stages are configured to convert the direct current supplied to the inverter power stages to alternating current that is supplied to the coils in the stator to rotate the magnets and the fan blades around a center line of the fan hub for propelling the aircraft.

2. The motor driven propulsor of claim 1, wherein the inverter power stages are close coupled with the coils.

3. The motor driven propulsor of claim 1, wherein the nacelle is configured to transfer heat generated in the coils of the stator over a large surface area that is outside of the fan blades and the fan hub.

4. The motor driven propulsor of claim 1, wherein the coils of the stator and the inverter power stages are thermally coupled with a radially inward surface of the nacelle and with a radially outward surface of the nacelle.

5. The motor driven propulsor of claim 1, wherein the inverter power stages and the gate drivers are coupled with a direct current bus, and the inverter power stages, the gate drivers, and the direct current bus are located within the nacelle.

6. The motor driven propulsor of claim 1, wherein the gate drivers are connected to a common positive direct current bus, a common negative direct current bus, and a common neutral bus.

7. The motor driven propulsor of claim 1, wherein the magnets are disposed within the fan shrouds of the fan blades in locations that are radially inside of an inner surface of the nacelle.

8. The motor driven propulsor of claim 1, wherein the nacelle includes a channel that extends around the center line of the fan hub, and wherein the magnets are located in radial protrusions of the fan shrouds that radially project away from the center line of the fan hub and into the channel in the nacelle.

9. The motor driven propulsor of claim 8, wherein the conductive coils in the stator are located on opposite sides of the channel in the nacelle.

10. The motor driven propulsor of claim 1, wherein the nacelle includes channels that extend around the center line of the fan hub, and wherein the magnets are located in radial protrusions of the fan shrouds that radially project away from the center line of the fan hub and into the channels in the nacelle.

11. The motor driven propulsor of claim 10, wherein the conductive coils in the stator are located between the channels in the nacelle.

12. The motor driven propulsor of claim 1, wherein the inverter power stages are connected with the gate drivers by optical fibers and the gate drivers are configured to control supply of the direct current to the inverter power stages using control signals communicated via the optical fibers.

13. A method for providing a motor driven propulsor of an aircraft, the method comprising:
    placing magnets disposed in fan shrouds of fan blades connected with a fan hub;
    positioning a stator having individual conductive coils in a nacelle located radially outside of the fan hub;
    coupling several inverter power stages of a distributed inverter assembly with several gate drivers, the inverter power stages coupled with the gate drivers;
    conductively coupling the inverter power stages with the coils in the stator,
    wherein the gate drivers are coupled with the inverter power stages to control supply of direct current to the inverter power stages, and the inverter power stages are coupled with the gate drivers and the coils to convert the direct current supplied to the inverter power stages to alternating current that is supplied to the coils in the stator to rotate the magnets and the fan blades around a center line of the fan hub for propelling the aircraft.

14. The method of claim 13, wherein conductively coupling the inverter power stages with the coils includes close coupling the inverter power stages with the coils.

15. The method of claim 13, wherein the coils of the stator are positioned in the nacelle and the inverter power stages are coupled with the coils such that the coils and the inverter power stages are thermally coupled with a radially inward surface of the nacelle and with a radially outward surface of the nacelle.

16. The method of claim 13, further comprising:
    coupling the inverter power stages and the gate drivers with a direct current bus such that the inverter power stages, the gate drivers, and the direct current bus are located within the nacelle.

17. The method of claim 13, wherein the nacelle includes one or more channels that extend around the center line of the fan hub, and wherein the magnets are positioned in radial protrusions of the fan shrouds that radially project away from the center line of the fan hub and into the one or more channels in the nacelle.

18. The method of claim 13, wherein the inverter power stages are coupled with the gate drivers by optical fibers.

19. A motor driven propulsor comprising:
- magnets disposed in fan shrouds of fan blades connected with a fan hub;
- a stator having individual conductive coils in a nacelle located radially outside of the fan hub; and
- a distributed inverter assembly having several inverter power stages, the inverter power stages close coupled with the coils in the stator,
- wherein the inverter power stages are configured to power the corresponding coil in the stator to rotate the magnets and the fan blades around a center line of the fan hub for generating a propulsive force, and
- wherein the inverter power stages are coupled with the coils in the stator such that one or more inverter power stages continue powering the coils to continue generating the propulsive force after failure of at least one of the inverter power stages.

20. The motor driven propulsor of claim 19, wherein the coils of the stator and the inverter power stages are thermally coupled with a radially inward surface of an aircraft nacelle and with a radially outward surface of the nacelle.

* * * * *